(12) United States Patent
Bork et al.

(10) Patent No.: US 6,633,932 B1
(45) Date of Patent: Oct. 14, 2003

(54) METHOD AND APPARATUS FOR USING A UNIVERSAL SERIAL BUS TO PROVIDE POWER TO A PORTABLE ELECTRONIC DEVICE

(75) Inventors: Stephan Bork, Dallas, TX (US); Carl Panasik, Garland, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/395,127

(22) Filed: Sep. 14, 1999

(51) Int. Cl.[7] .................. G06F 13/00; G06F 15/177; G06F 1/26; H02J 7/00; H02M 7/00
(52) U.S. Cl. ................. 710/72; 710/8; 710/10; 710/15; 710/18; 710/19; 710/62; 710/63; 710/64; 710/101; 710/103; 710/104; 710/129; 713/1; 713/300; 713/340; 363/13; 320/107; 320/110; 320/112; 320/113; 320/114; 320/115
(58) Field of Search ................. 710/1, 2, 7, 8, 710/10, 11, 15, 18–20, 29, 62–64, 71–74, 100–105, 126, 129; 713/1, 100, 300, 320, 340; 363/13; 320/107, 110, 112–115

(56) References Cited

U.S. PATENT DOCUMENTS

| | | | | |
|---|---|---|---|---|
| 5,884,086 A | * | 3/1999 | Amoni et al. | 713/300 |
| 5,935,224 A | * | 8/1999 | Svancarek et al. | 710/63 |
| 5,991,546 A | * | 11/1999 | Chan et al. | 395/882 |
| 6,000,042 A | * | 12/1999 | Henrie | 714/40 |
| 6,003,138 A | * | 12/1999 | Chung | 713/300 |
| 6,044,428 A | * | 3/2000 | Rayabhari | 710/129 |
| 6,105,097 A | * | 8/2000 | Larky et al. | 710/129 |
| 6,105,143 A | * | 8/2000 | Kim | 713/324 |
| 6,131,125 A | * | 10/2000 | Rostoker et al. | 709/250 |
| 6,131,134 A | * | 10/2000 | Huang et al. | 710/103 |
| 6,138,242 A | * | 10/2000 | Massman et al. | 363/13 |
| 6,147,682 A | * | 11/2000 | Kim | 345/211 |
| 6,151,653 A | * | 11/2000 | Lin et al. | 710/129 |
| 6,170,062 B1 | * | 1/2001 | Henrie | 713/340 |
| 6,178,514 B1 | * | 1/2001 | Wood | 713/300 |
| 6,184,652 B1 | * | 2/2001 | Yang | 320/110 |
| 6,255,800 B1 | * | 7/2001 | Bork | 320/115 |
| 6,263,392 B1 | * | 7/2001 | McCauley | 710/129 |
| 6,279,060 B1 | * | 8/2001 | Luke et al. | 710/64 |
| 6,334,160 B1 | * | 12/2001 | Emmert et al. | 710/11 |
| 6,334,793 B1 | * | 1/2002 | Amoni et al. | 439/680 |

OTHER PUBLICATIONS

Lucent Technologies, "USS–720 Instant USB USB–to–IEEE 1284 Bridge", Advanced Data Sheet, Rev. 5, Nov. 1997, pp 1–27.*

* cited by examiner

Primary Examiner—Jeffrey Gaffin
Assistant Examiner—Tanh Q Nguyen (57) ABSTRACT

A method and apparatus for using a universal serial bus "USB" in a computer as a power source for a portable electronic device. In one embodiment of the invention, a computer (26) having an external USB connector (38) is coupled to the external power input connector on a portable electronic device, such as a cellular telephone (14). The computer (26) is coupled to the cellular telephone (14) via a cable having one end connected to a first connector and another end connected to a second connector, the first connector being connected to the USB connector (38) on said computer (26), and the second connector being connected to external power input connector on the portable electronic device. The cable includes electronic circuitry (42, 62) for converting the voltage level supplied by the USB to a voltage level usable by the portable electronic device.

35 Claims, 9 Drawing Sheets

METHOD AND APPARATUS FOR USING A UNIVERSAL SERIAL BUS TO PROVIDE POWER TO A PORTABLE ELECTRONIC DEVICE

FIELD OF THE INVENTION

The present invention relates to the field of providing power to a portable electronic device for operation and/or recharging of the device's batteries. More specifically, the present invention relates to a method and apparatus for using a Universal Serial Bus "USB" in a computer to power and/or recharge batteries in a portable electronic device.

BACKGROUND OF THE INVENTION

Electronic devices typically require a power source for proper operation. Some devices obtain their power from a power cord coupled to a conventional power supply (such as a power receptacle—for example, 110 VAC). Devices having an input voltage requirement less than the supply voltage may also have a step down transformer or voltage reducing circuit. For example, a transformer or other voltage conversion or regulator circuitry may be used to reduce a supply voltage of 110 VAC, supplied by a power receptacle on a wall, to the required input voltage of the device. For devices requiring DC voltage, an AC/DC converter may also coupled between the step down transformer and the device.

Many electronic devices are also portable. While some portable electronic devices derive their power from batteries all the time, others derive their power from batteries while the device is in a portable mode and from a power cord coupled to a conventional power supply, as described above, when the device is near a permanent power supply. In either situation, the batteries will eventually run down if the device is operated when there is no power available from an outside source. When depleted, batteries of the rechargeable type can be recharged while non-rechargeable batteries must be replaced.

Figures 1, 2:
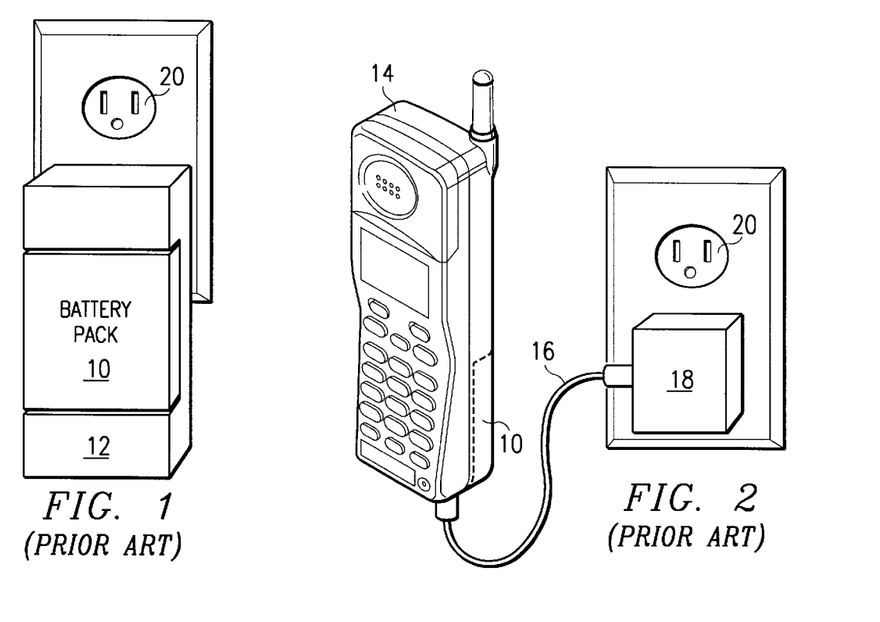
FIG. 1 illustrates a battery pack being recharged in a battery recharger.
FIG. 2 illustrates a cellular phone coupled to a dedicated power supply via a power cable.
Figure 3:
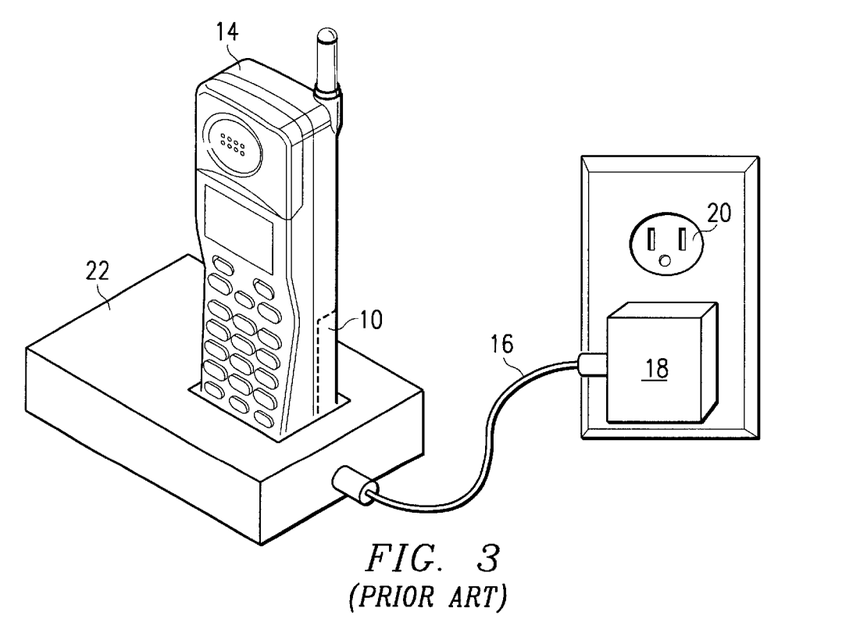
FIG. 3 illustrates a cellular phone resting in cradle which itself is coupled to a dedicated power supply via a power cable.

Portable electronic devices having rechargeable batteries may have their batteries recharged in one of three methods. First, batteries 10 within a portable electronic device may be physically removed from the device and placed in a battery recharge mechanism 12 until recharged, as illustrated in FIG. 1. The batteries are replaced in the device after being recharged. Second, batteries 10 may be recharged within a portable electronic 14 device (in this case a cellular telephone) via a power cord 16 (typically having a transformer 18 at one end of the power cord—typically the portion that plugs into the power source) coupling the portable electronic device to a conventional power supply 20, as discussed above and illustrated in FIG. 2. Third, batteries (not shown) within a portable electronic device 14 may also be recharged within device 14 while the device is placed within a charging receptacle 22 that is coupled, via a power cord 16, to a conventional power supply 20, as illustrated in FIG. 3.

The first method (shown in FIG. 1) is awkward and burdensome. The electronic device using the batteries is typically unusable—if of the battery only type—while its batteries are removed. There is also the potential problem of losing or damaging the batteries and/or the device itself through mishandling of the device or batteries and wear resulting from the continual process of removing and replacing batteries. If the device is of the type allowing operation from a power cord only, the mobility of the device is limited to the length of the power cord. The second method (shown in FIG. 2) is more convenient than the first method in that the batteries are not removed from the device while recharging, which facilitates immediate operation of the device, even if the batteries are not fully charged. There remains, however, the problem of having a recharge cord available when you need it. This is particularly so with small portable devices, such as cellular telephones, pagers, PDAs, etc., since the recharge cord itself may take up more storage space than the device itself. The third method (shown in FIG. 3) is the most convenient since the device can be simply placed in the charging cradle, recharging the batteries, while the device awaits reuse. One disadvantage of the charging cradles of the prior art is that they require a power cable coupling the charging cradle to a dedicated power source, such as a 110 VAC wall outlet or 12 VDC outlet (such as an automotive cigarette lighter power supply). Such recharging techniques are useless in situations where there are no, or insufficient, discrete power sources available to plug in the power cord of the charging cable.

SUMMARY OF THE INVENTION

The invention disclosed herein comprises a method and apparatus for using a universal serial bus "USB" in a computer as a power source for a portable electronic device. In one embodiment of the invention, a computer having an external USB connector is coupled to the external power input connector on a portable electronic device, such as a cellular telephone. The computer is coupled to the cellular telephone via a cable having one end connected to a first connector and another end connected to a second connector, the first connector being connected to the USB connector on said computer, and the second connector being connected to external power input connector on said portable electronic device. The cable includes electronic circuitry for converting the voltage level supplied by the USB to a voltage level usable by the portable electronic device.

In one embodiment of the invention, the electronic circuitry is in the first connector. In another embodiment of the invention, the electronic circuitry is in the second connector. In still another embodiment of the invention, the circuitry is placed in the cable somewhere between the first and second connectors. In still yet another embodiment of the invention, a method and apparatus for using a universal serial bus in a computer as a power source and data port for a portable electronic device. The cable includes electronic circuitry for converting the voltage level supplied by the USB to a voltage level usable by the portable electronic device and for providing a data port between the computer and the portable electronic device. As with previously discussed embodiments of the invention, in one embodiment, the electronic circuitry is in the first connector. In another embodiment of the invention, the electronic circuitry is in the second connector. In still another embodiment of the invention, the circuitry is placed in the cable somewhere between the first and second connectors. Advantages of the invention include: elimination of the need for a separate power cable when the computer and the portable electronic device are used together—saving both cost of acquiring the additional power cable and travel space; a reduction from two dedicated power sources (one for computer and one for the portable electronic device) to one (for the computer only); and a convenient way to supply power to the portable electronic device from the computer's batteries when no external power source is available for either device.

DESCRIPTION OF THE DRAWINGS

The novel features believed characteristic of the invention are set forth in the appended claims. The invention itself, however as well as other features and advantages thereof, will be best understood by reference to the detailed description which follows, read in conjunction with the accompanying drawings, wherein:

DETAILED DESCRIPTION OF THE INVENTION

Cellular telephones are but one of many portable electronic devices that utilize batteries for their power supply. If equipped with rechargeable batteries (typically in the form of a battery pack), the batteries can be recharged in any of the methods described above in FIGS. 1–3. When the method of FIG. 2 is selected, the cellular phone is powered and its batteries are recharged via a clumsy power cable (presumably including a transformer 18 to reduce the voltage down from a higher voltage (e.g., 110 VAC), to a lower voltage, say 3.7 volts at 370 mA)). If the method of FIG. 3 is selected, the cellular phone is powered and batteries are recharged while the cellular telephone rests in the cradle 22. In either recharging scenario, the phone makes all the choices as to whether or not it takes the power, how much, and for how long. The required power management is already in the phone. Delivering raw power is the sole function of the directly connected power cable 16 of FIG. 2 or power connector in cradle 22.

Figure 4:
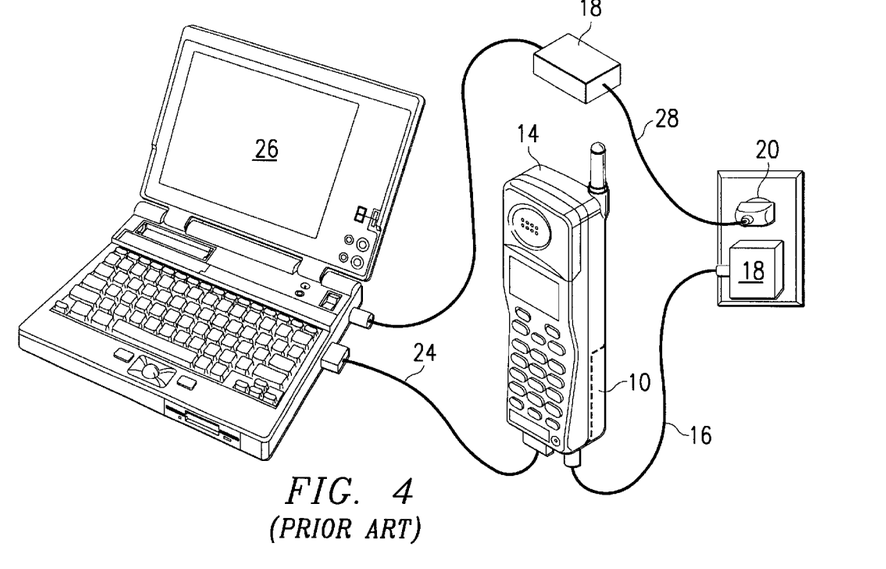
FIG. 4 illustrates a cellular phone coupled to a dedicated power supply via a power cable and coupled to a data source (computer) via a data cable.
Figure 5:
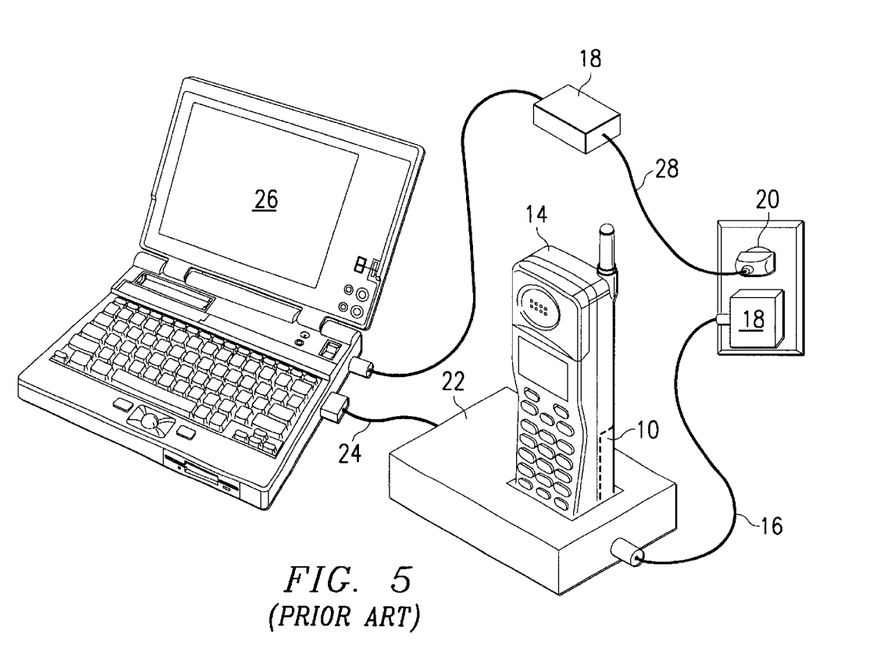
FIG. 5 illustrates a cellular phone resting in a cradle which itself is coupled to a dedicated power supply via a power cable and coupled to a data source (computer) via a data cable.
Figure 6:
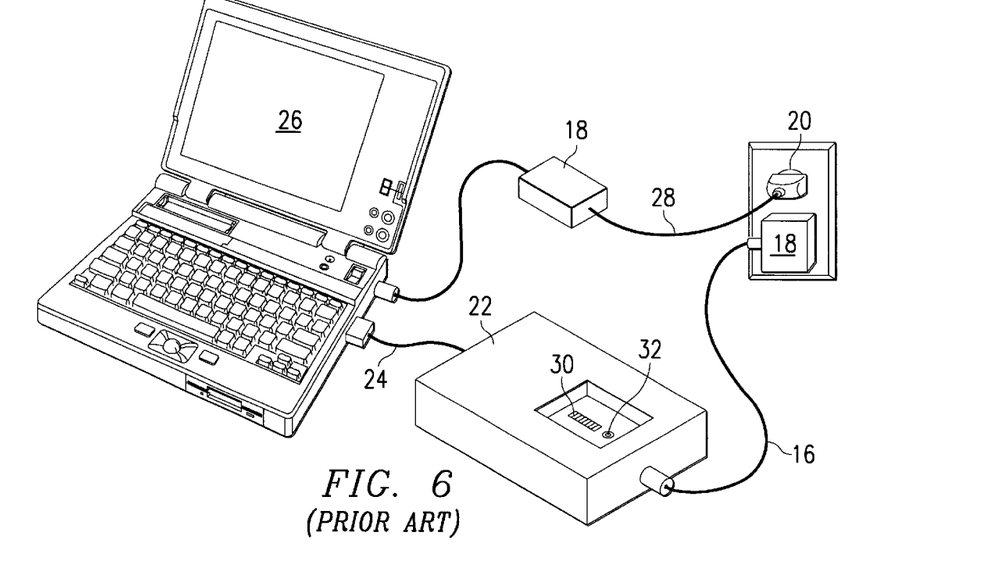
FIG. 6 illustrates a cradle for a cellular phone in which the cradle has a first connector coupled to a dedicated power supply via a power cable and a second connector coupled to a data source (computer) via a data cable.
Figure 7:
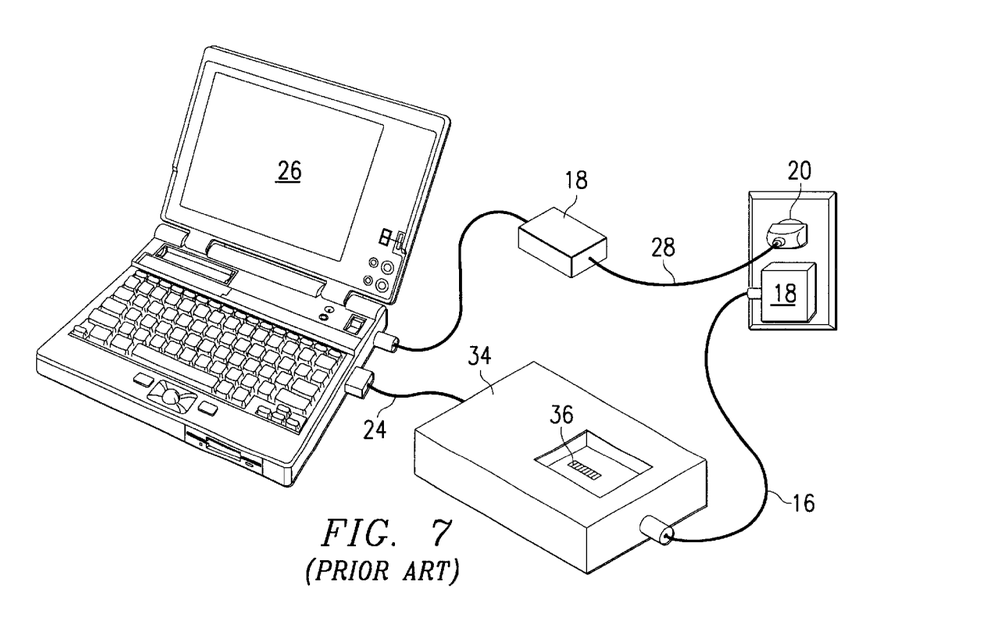
FIG. 7 illustrates a cradle for a cellular phone in which the cradle has a combined power/data connector coupled to a dedicated power supply via a power cable and a second connector coupled to a data source (computer) via a data cable.

For devices that further require data synchronization, such as selected personal digital assistants "PDAs" or selected cellular phones, in addition to a power cable 16 as described above for supplying power, the PDA or cellular phone requires a separate cable 24 coupling the PDA or cellular phone (in this case cellular phone 14) to a data source 26, such as a computer, which itself is typically coupled to a dedicated power source 20 via a power cable 28, as shown in FIG. 4. A cradle may also be adapted to supply both power and data to an electronic device 14, as shown in FIG. 5. In one embodiment, shown in FIG. 6, cradle 22 has both a connector for power 30 and a data connector 32. In another embodiment, shown in FIG. 7, cradle 34 has a single power and data connector 36 for coupling power (via cable 16) and data (via cable 24) the cellular phone 14.

Unfortunately, in the prior art embodiments of FIGS. 4–7, three separate cables are required: power cable 16 coupling cellular phone 14 or cradle 22 or 34 to dedicated power source 20; power cable 28 coupling data source 26 to dedicated power source 20; and data cable 24 coupling data source 26 to cellular phone 14 or cradle 22 or 34. If there is but one dedicated power source, then one of the devices—cellular phone 14 or data source 26, must draw power from its own batteries. If no dedicated power source is available, then both cellular phone 14 and data source 26 must rely on their own batteries for power. Additional problems can arise from the space requirements of all three cables—the two power cables each having a bulky integrated transformer and/or voltage regulator, which take up a lot of valuable space while traveling. In addition to the space requirements, the cost of the cables are not insignificant, especially the power cables which typically include an expensive transformer. What is needed is an apparatus or method for allowing a cellular phone (or other electronic device) to draw power from a non-dedicated power supply on data source 26 instead of from a dedicated power supply.

Figure 8:
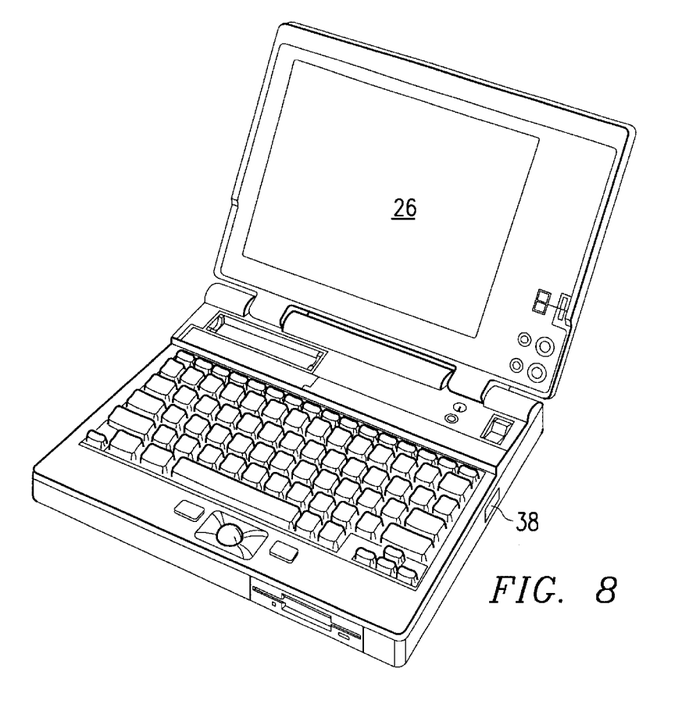
FIG. 8 illustrates a computer having a universal serial bus "USB" connector.
Figure 9:
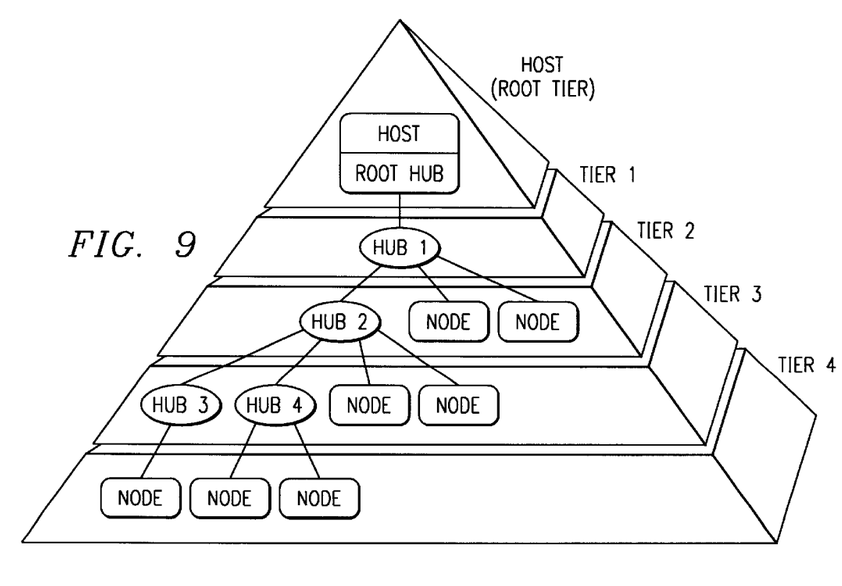
FIG. 9 illustrates a bus topology for a universal serial bus.

FIG. 8 illustrates a portable computer 26 equipped with at least one universal serial bus "USB" connector 38. USB connector 38 is coupled to a USB within computer 26 (not shown). Universal serial bus is defined in the Universal Serial Bus Specification Revision 1.1, Sep. 23, 1998, incorporated herein by reference. FIG. 9 illustrates a bus topology of the USB. The USB connects USB devices with the USB host. The USB physical interconnect is a tiered star topology. A hub is at the center of each star. Each wire segment is a point-to-point connection between the host and a hub or function, or a hub connected to another hub or function. There is only one host in any USB system. The USB interface to the host computer system is referred to as the Host Controller. The Host Controller may be implemented in a combination of hardware, firmware, or software. A root hub is integrated within the host system to provide one or more attachment points.

USB devices are one of the following: hubs, which provide additional attachment points to the USB; or functions, which provide capabilities to the system, such as an ISDN connection, a digital joystick, speakers, etc. USB devices present a standard USB interface in terms of the following: their comprehension of the USB protocol; their response to standard USB operations, such as configuration and reset; and their standard capability descriptive information.

Figure 10:
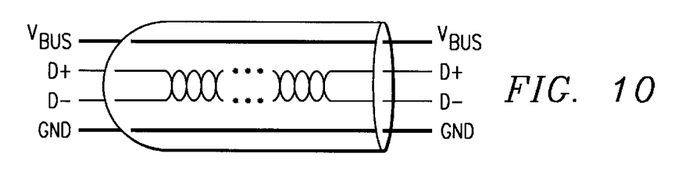
FIG. 10 illustrates a USB cable.

The USB transfers signal and power over a four-wire cable, shown in FIG. 10. The signal occurs over two wires on each point-to-point segment. There are two data rates: the USB full-speed signal bit rate is 12 Mb/s; and a limited capability low-speed signal mode is also defined at 1.5 Mb/s. The low-speed mode requires less EMI protection. Both modes can be supported in the same USB bus by automatic dynamic mode switching between transfers. The low-speed mode is defined to support a limited number of low-bandwidth devices, such as mice, because general use would degrade bus utilization. The clock is transmitted, encoded along with the differential data. The clock encoding scheme is NRZI with bit stuffing to ensure adequate transitions. A SYNC field precedes each packet to allow the receiver(s) to synchronize their bit recovery clocks. The cable also carries Vbus is nominally +5V at the source. The USB allows cable segments of variable lengths, up to several meters, by choosing the appropriate conductor gauge to match the specified IR drop and other attributes such as device power budget and cable flexibility. In order to provide guaranteed input voltage levels and proper termination impedance, biased terminations are used at each end of the cable. The terminations also permit the detection of attach and detach at each port and differentiate between full-speed and low-speed devices.

Figure 11:
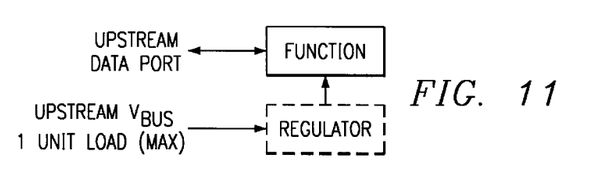
FIG. 11 illustrates a low-power bus-powered function.

There are also both low and high power bus-powered functions. A low power function is one that draws up to one unit load from the USB cable when operational. FIG. 11 shows a typical bus-powered, low-power function, such as a mouse. Low-power regulation can be integrated into the function silicon. Low-power functions must be capable of operating with input Vbus voltages as low as 4.40V, measured at the end of the cable.

Figure 12:
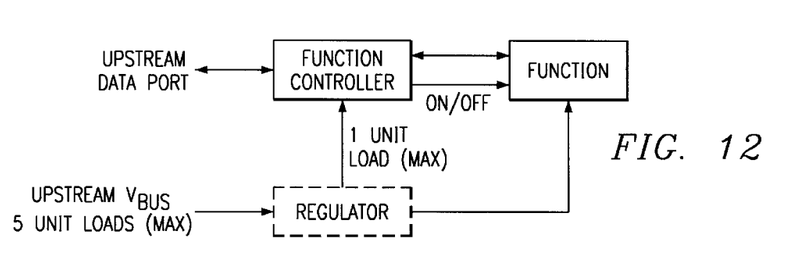
FIG. 12 illustrates a high-power bus-powered function.

A function is defined as being high-power if, when fully powered, it draws over one but not more than five unit loads from the USB cable. A high-power function requires staged switching of power. It must first come up in a reduced power state of less than one unit load. At bus enumeration time, its total power requirements are obtained and compared against the available power budget. If sufficient power exists, the remainder of the function may be powered on. A typical high-power function is shown in FIG. 12. The function's electronics have been partitioned into two sections. The function controller contains the minimum amount of circuitry necessary to permit enumeration and power budgeting. The remainder of the function resides in the function block. High-power functions must be capable of operating in their low-power (one unit load) mode with an input voltage as low as 4.40V, so that it may be detected and enumerated even when plugged into a bus-powered hub. They must also be capable of operating at full power (up to five unit loads) with a Vbus voltage of 4.75V, measured at the upstream plug end of the cable.

Figure 13:
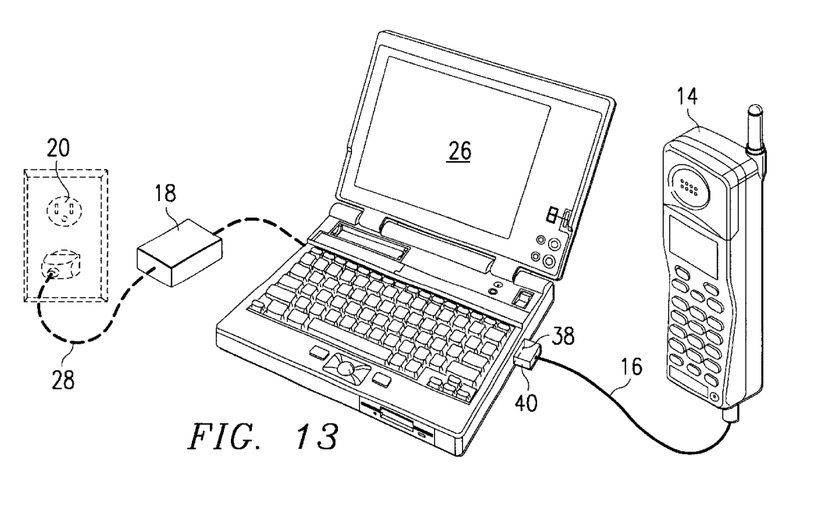
FIG. 13 illustrates a system in which a cable (having electronic circuitry in the connector that plugs into the USB of a computer) couples a USB connector of a computer to a power connector on a cellular phone in order to power and/or recharge the cellular phone's batteries.

As a result, the universal serial bus in computer 26 has power lines (+4.5 VDC and GND), which may be tapped to power and/or recharge the batteries of a peripheral portable electronic device, such as cellular telephone 14. FIG. 13 illustrates a method and apparatus for using the voltage available on a universal serial bus in a computer as the source of power to power and/or recharge the batteries of a non-USB enabled peripheral portable electronic device. In the embodiment of FIG. 13, electronic circuitry within a connector 40 couples a USB connector 38 on portable computer 26 to a power cable 16 (in this embodiment a two wire cable). Power cable 16 is connected to the power connector on cellular telephone 14. Electronic circuitry within connector 40 converts the voltage outputted by the USB of portable computer 26 to a voltage that may be used to power and/or recharge the batteries in cellular phone 14.

Figure 14:
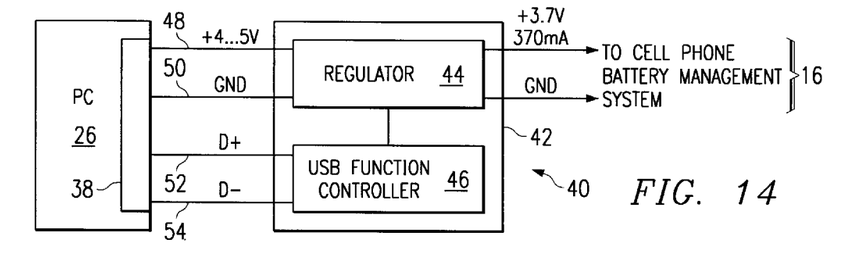
FIG. 14 illustrates the electronic circuitry of FIG. 13.
Figure 15:
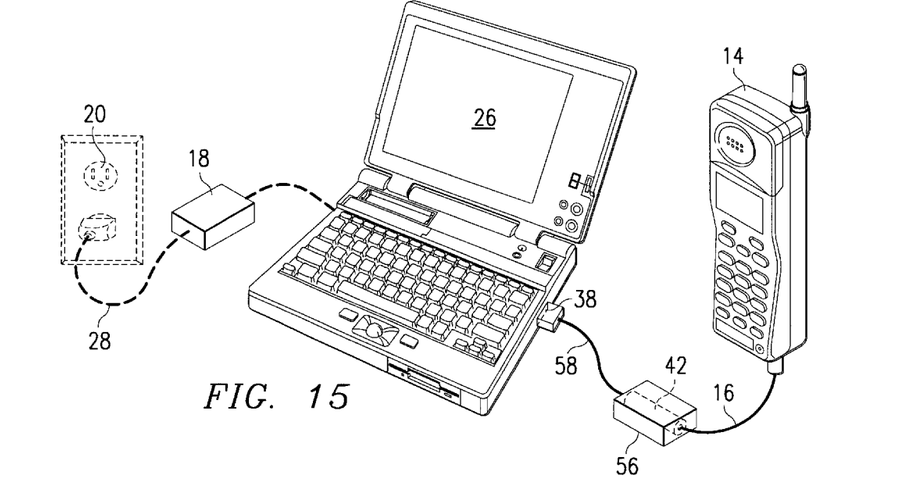
FIG. 15 illustrates a system in which a cable (having electronic circuitry in a module or protective case somewhere along the length of the cable) couples a USB connector of a computer to a power connector on a cellular phone in order to power and/or recharge the cellular phone's batteries.
Figure 16:
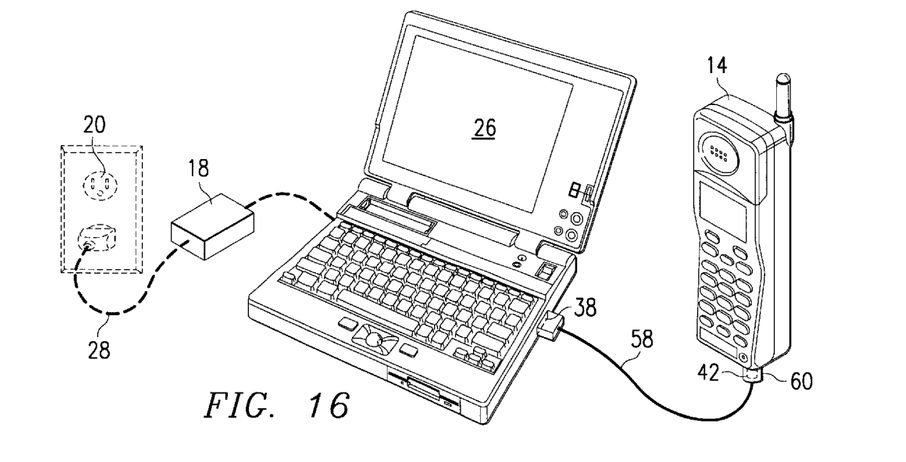
FIG. 16 illustrates a system in which a cable (having electronic circuitry in a connector that couples to the power connector in the cellular phone) couples a USB connector of a computer to a power connector on a cellular phone in order to power and/or recharge the cellular phone's batteries.

FIG. 14 is a block diagram of the electronic circuitry 42 within connector 40. Electronic circuitry 42 comprises a voltage regulator 44 coupled to a USB function controller 46 (such as an Intel 930). Regulator 44 has a first lead 48 coupled, via a conductor in USB connector 38, to receive the +4.5 VDC available on the USB of portable computer 42, and a second lead 50 coupled, via another conductor in USB connector 38, to ground. USB function controller 46 has a first lead 52 coupled, via a conductor in USB connector 38, to receive data D+, and a second lead 54 coupled, via a conductor in USB connector 38, to receive data D−. And while circuitry 42 is disclosed as being within connector 40, which is directly connected to connector 38 in the present embodiment, circuitry 42 could just as easily be placed in a module spaced anywhere in the cable coupling connector 38 to cellular phone 14. As an example, FIG. 15 discloses an embodiment of the invention in which circuitry 42 is in a module or protective case 56 coupled to connector 38 via a four-wire cable 58. Circuitry 42 is further connected to cellular phone 14 via two-wire cable 16. In another embodiment of the invention, circuitry 42 is placed within a connector 60 coupling a four-wire cable 58 to cellular phone 14, as shown in FIG. 16.

Figure 17:
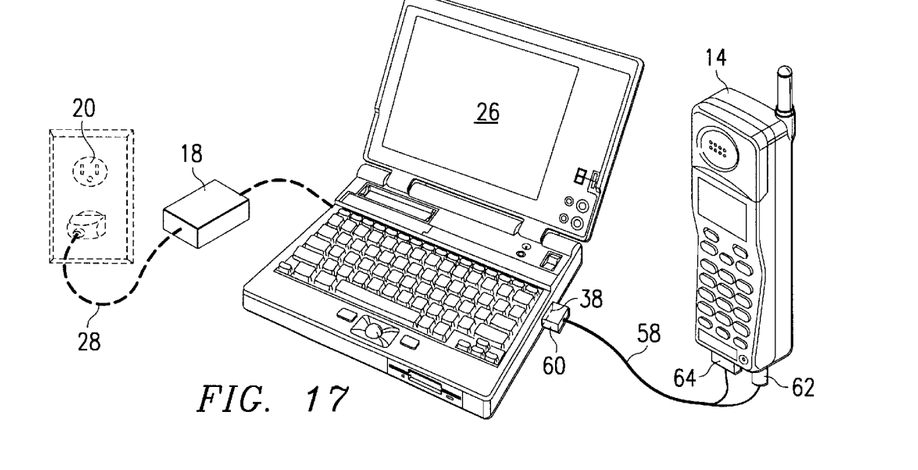
FIG. 17 illustrates a system in which a cable (having electronic circuitry in the connector that plugs into the USB of a computer) couples a USB connector of a computer to power and data connectors on a cellular phone in order to power and/or recharge the cellular phone's batteries and to facilitate the exchange of data between the portable computer and the cellular phone.
Figure 18:
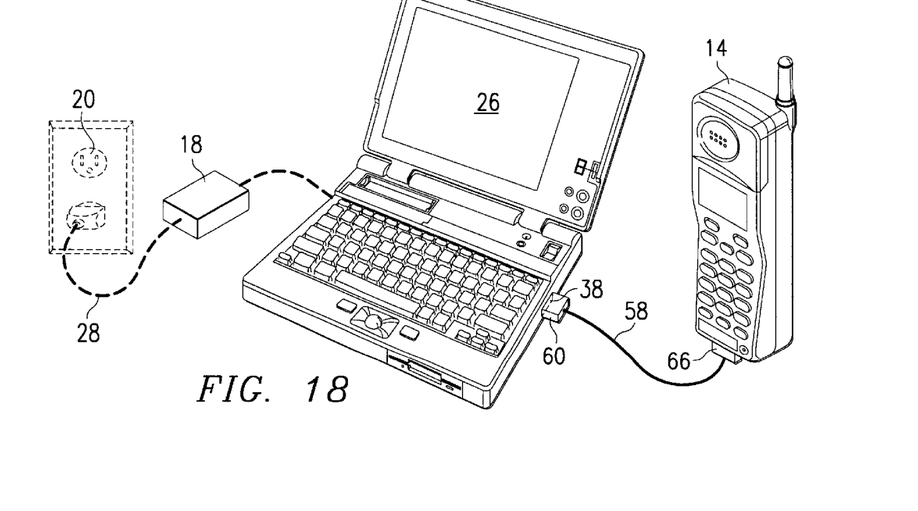
FIG. 18 illustrates a system in which a cable (having electronic circuitry in the connector that plugs into the USB of a computer) couples a USB connector of a computer to a combined power/data connector on a cellular phone in order to power and/or recharge the cellular phone's batteries and to facilitate the exchange of data between the portable computer and the cellular phone.

In the embodiment of FIG. 17, electronic circuitry within a connector 60 couples a USB connector 38 on portable computer 26 to a four-conductor cable 58 (for power and data). Power and data cable 58 is connected to the power 62 and data 64 connectors on cellular phone 14 (in the case of phone 14 having separate power and data connectors), or to a single power and data connector 66 (in the case of phone 14 having a single power/data connector), as illustrated in FIG. 18. Electronic circuitry within connector 60 converts the voltage outputted by the USB of portable computer 26 to a voltage that may be used to power and/or recharge the batteries in cellular phone 14 and also facilitates the movement of data back and forth between portable computer 26 and phone 14.

Figure 19:
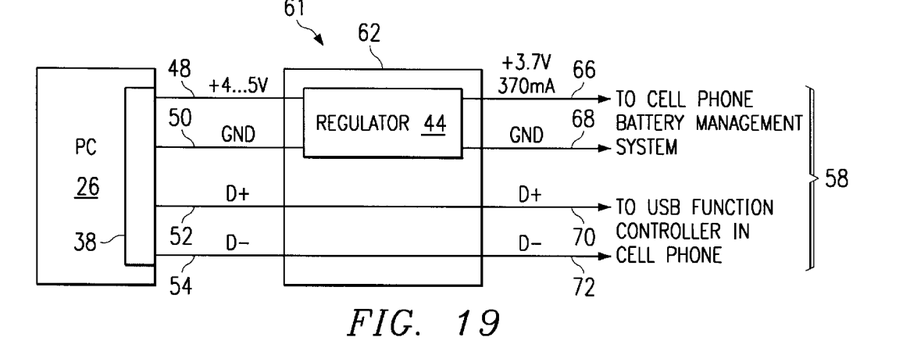
FIG. 19 illustrates the electronic circuitry of FIGS. 17 and 18.
Figure 20:
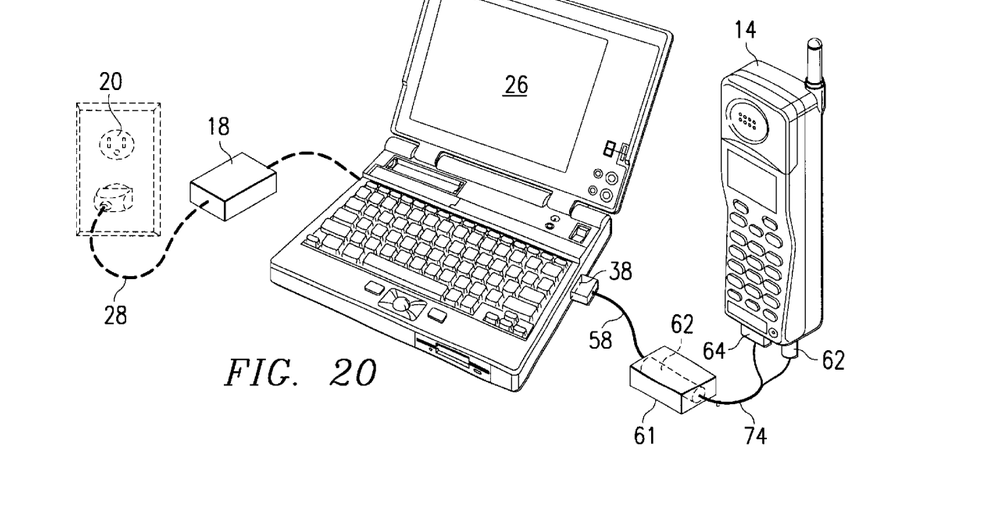
FIG. 20 illustrates a system in which a cable (having electronic circuitry in a module or protective case somewhere along the length of the cable) couples a USB connector of a computer to power and data connectors on a cellular phone in order to power and/or recharge the cellular phone's batteries and to facilitate the exchange of data between the portable computer and the cellular phone.

FIG. 19 is a block diagram of the electronic circuitry 62 within connector 60. Electronic circuitry 62 comprises a voltage regulator 44 (such as a TPS7133) coupled to a USB function controller 64 (such as a member of the Intel 8X930 family). Regulator 44 has a first lead 48 coupled, via a conductor in USB connector 38, to receive the +4.5 VDC available on the USB of portable computer 42, and a second lead 50 coupled, via another conductor in USB connector 38, to ground. Regulator 44 further has a third lead 66 coupled to the +VDC connection and a fourth lead 68 coupled to the ground "GND" connection of the power connector (or power/data connector), of cellular phone 14. USB function controller 64 has a first lead 52 coupled, via a conductor in USB connector 38, to receive data D+, and a second lead 54 coupled, via a conductor in USB connector 38, to receive data D−, a third lead coupled .USB function controller 64 further has a third lead 70 for providing data D+to a first data connection and a fourth lead 72 for providing data D−, to the data connector (or power/data connector), of cellular phone 14. And while circuitry 42 is disclosed as being within connector 40, which is directly connected to connector 38 in the present embodiment, circuitry 62 could just as easily be placed in a module spaced anywhere in the cable coupling connector 38 to cellular phone 14. As an example, FIG. 20 discloses an embodiment of the invention in which circuitry 62 is in a module or protective case 61 coupled to connector 38 via a four-wire cable 58. Circuitry 62 is further connected to cellular phone 14 via a second four-wire cable 74. In the embodiment of the invention shown in FIG. 16, cellular phone 14 has separate power and data connectors. The power leads of cable 74 terminate in connector 62, which couples to the power connector in phone 14, while the data leads of cable 74 terminate in connector 64, which couples to the data connector in phone 14.

Figure 21:
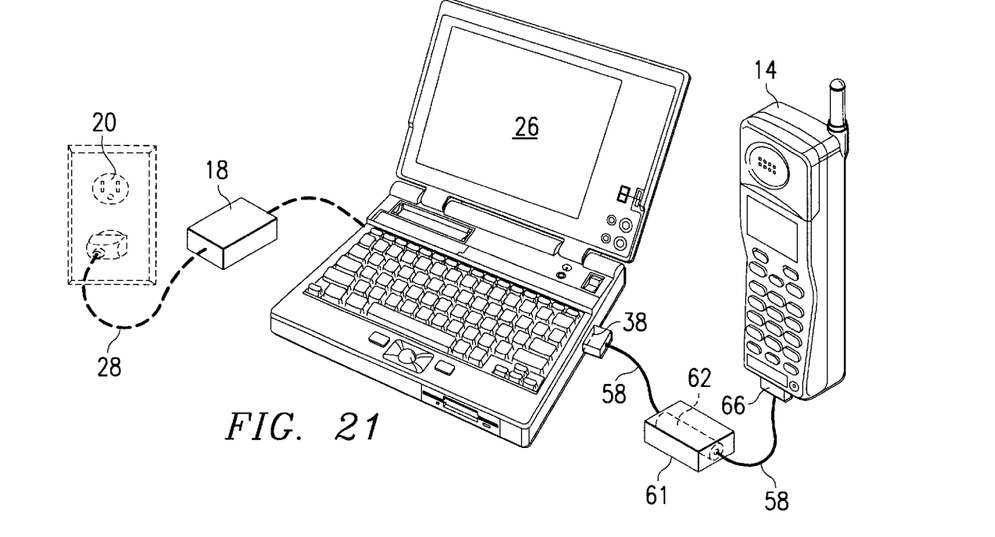
FIG. 21 illustrates a system in which a cable (having electronic circuitry in a module or protective case somewhere along the length of the cable) couples a USB connector of a computer to a combined power/data connector on a cellular phone in order to power and/or recharge the cellular phone's batteries and to facilitate the exchange of data between the portable computer and the cellular phone.
Figure 22:
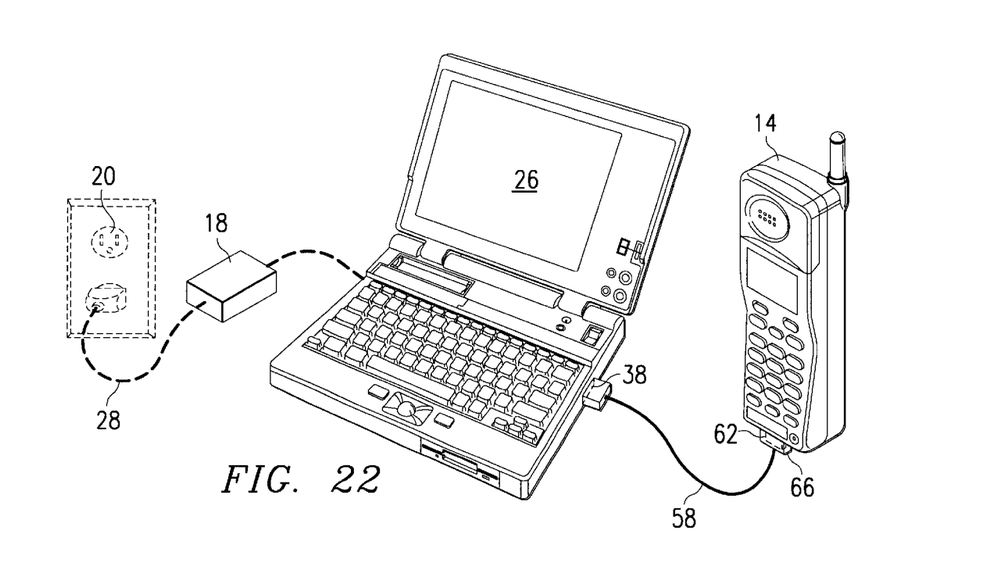
FIG. 22 illustrates a system in which a cable (having electronic circuitry in the connector that plugs into combined power/data connector on the cellular phone) couples a USB connector of a computer to a combined power/data connector on a cellular phone in order to power and/or recharge the cellular phone's batteries and to facilitate the exchange of data between the portable computer and the cellular phone.

FIG. 21 discloses an embodiment of the invention in which phone 14 has a combined power/data connector. In this embodiment, the power and data leads of cable 74 terminate in connector 66, which couples to the corresponding power/data connector in phone 14. FIG. 22 discloses an embodiment of the invention in which circuitry 62 is placed within a combined power/data connector 66 which connects to a corresponding data/power connector on phone 14.

All embodiments of the invention facilitate the elimination of a need for a power cable that couples cellular phone 14 to a dedicated power source—which eliminates the expense of the cable, and the extra room required to transport the cable during mobile operations. The invention facilitates using the power available on a universal serial bus in a computer as the power source for powering and/or recharging batteries for a portable peripheral device, such as cellular phone 14. The USB is able to accommodate the power needs of cellular phone 14 since computer 26 has a voltage converter or regulator which can easily provide for the small additional demands of a cellular telephone.

Moreover, the USB controller in the connector 40, module 56, or connector 60 contains at least the minimum amount of circuitry for a USB function controller to permit enumeration and power budgeting. There is a USB host in the computer but no USB function controller (in general there is always a USB host in a USB enabled computer while the USB function controllers are in the devices that are connected to the computer via USB cable. Therefore, the circuitry must enumerate the USB device (which in this case is the connector), in order to draw current out of the USB port on the computer. The actual amount of current drawn could vary from, e.g., 1 . . . 5 unit loads or the USB function controller could negotiate with the USB host the maximum amount of current the host will grant to the connector, and convert the voltage level from Vbus to whatever voltage level is required by the phone. The result is cost and space savings.

Yet another advantage of the present invention is the fact that a cellular phone can draw power from computer 26 while computer 26 is running solely on its batteries—e.g., no power source is available to plug into. This is an important advantage while traveling. The batteries in computer 26 have more capacity than those in cellular phone 14 and can easily be used to supply the small additional amounts of power the cellular phone requires. Indeed, in such a situation where the computer is running on battery power, only one cable is required to supply power and/or power and data to cellular phone 14.

While this invention has been described with reference to illustrative embodiments, this description is not to be construed in a limiting sense. Various modifications to the illustrative embodiments, as well as other embodiments of the invention will be apparent to persons skilled in the art upon reference to this description. For example, while a universal serial bus has been used in the embodiments of the invention, other buses having a source of power within the bus could also be used. Further, while a cellular telephone has been given as an example of a portable electronic device, other devices could be used, such as personal digital assistants "PDAs", pagers, short distance portable telephones. It is even possible to use the power supplied by the USB of the computer to operate electronic games/toys, and/or recharge their batteries. It is therefore contemplated that the appended claims will cover any such modifications or embodiments as fall within the true scope of the invention.

What is claimed is:

1. A system, comprising:

a computer having a universal serial bus "USB" being terminated in a connector;

a non-USB enabled portable electronic device having a connector for the external application of power to said portable electronic device; and a cable having one end connected to a first connector and another end connected to a second connector, said first connector being connected to said connector in said computer, and said second connector being connected to said connector in said portable electronic device, said first connector further including electronic circuitry in said first connector for enumerating said USB, identifying said electronic circuitry as a USB device, and converting the voltage level supplied by said USB to a voltage level usable by said portable electronic device, said electronic circuitry comprising a regulator coupled to a USB function controller, said USB function controller identifying the electronic circuitry as a USB high-power function, said regulator coupled to receive power from said connector on said computer and to output power to said portable electronic device in accordance with the high power function.

2. A system, comprising:

a computer having a universal serial bus "USB" being terminated in a connector;

a non-USB enabled portable electronic device having a connector for the external application of power to said portable electronic device; and a cable having one end connected to a first connector and another end connected to a second connector, said first connector being connected to said connector in said computer, and said second connector being connected to said connector in said portable electronic device, said cable further including electronic circuitry spaced between said first and second connectors for enumerating said USB, identifying said electronic circuitry as a USB device, and converting the voltage level supplied by said USB to a voltage level usable by said portable electronic device, said electronic circuitry comprising a regulator coupled to a USB function controller, said USB function controller identifying the electronic circuitry as a USB high-power function, said regulator coupled to receive power from said connector on said computer and to output power to said portable electronic device in accordance with the high power function.

3. A system, comprising:

a computer having a universal serial bus "USB" being terminated in a connector;

a non-USB enabled portable electronic device having a connector for the external application of power to said portable electronic device; and a cable having one end connected to a first connector and another end connected to a second connector, said first connector being connected to said connector in said computer, and said second connector being connected to said connector in said portable electronic device, said second connector further including electronic circuitry in said second connector for enumerating said USB, identifying said electronic circuitry as a USB device, and converting the voltage level supplied by said USB to a voltage level usable by said portable electronic device, said electronic circuitry comprising a regulator coupled to a USB function controller, said USB function controller identifying the electronic circuitry as a USB high-power function, said regulator coupled to receive power from said connector on said computer and to output power to said portable electronic device in accordance with the high power function.

4. The system of claim 1, wherein the voltage level supplied by said USB is Vbus.

5. The system of claim 2, wherein the voltage level supplied by said USB is Vbus.

6. The system of claim 3, wherein the voltage level supplied by said USB is Vbus.

7. The system of claim 1, wherein said portable electronic device is a cellular telephone.

8. A method of providing power to a portable electronic device, comprising the steps of:

providing a cable for coupling power from a universal serial bus "USB" in a computer to a non-USB enabled portable electronic device;

coupling a first connector at one end of said cable to a corresponding connector associated with said USB in said computer, said first connector including electronic circuitry for enumerating said USB, identifying said electronic circuitry as a USB device, and converting the voltage level supplied by said USB to a voltage level usable by said portable electronic device, said electronic circuitry comprising a regulator coupled to a USB function controller, said USB function controller identifying the electronic circuitry as a USB high-power function, said regulator coupled to receive power from said connector on said computer and to output power to said portable electronic device in accordance with the high power function; and coupling a second connector at the other end of said cable to a corresponding connector in said portable electronic device, said corresponding connector in said portable electronic device providing external access for supplying power to said portable electronic device.

9. A method of providing power to a portable electronic device, comprising the steps of:

providing a cable for coupling power from a universal serial bus "USB" in a computer to a non-USB enabled portable electronic device, said cable including electronic circuitry spaced between said first and second connectors for enumerating said USB, identifying said electronic circuitry as a USB device, and for converting the voltage level supplied by said USB to a voltage level usable by said portable electronic device, said electronic circuitry comprising a regulator coupled to a USB function controller, said USB function controller identifying the electronic circuitry as a USB high-power function, said regulator coupled to receive power from said connector on said computer and to output power to said portable electronic device in accordance with the high power function;

coupling a first connector at one end of said cable to a corresponding connector associated with said computer, said corresponding connector being coupled to said USB; and coupling a second connector at the other end of said cable to a corresponding connector in said portable electronic device, said corresponding connector in said portable electronic device providing external access for supplying power to said portable electronic device.

10. A method of providing power to a portable electronic device, comprising the steps of:

providing a cable for coupling power from a universal serial bus "USB" in a computer to a non-USB enabled portable electronic device;

coupling a first connector at one end of said cable to a corresponding connector associated with said computer, said corresponding connector being coupled to said USB; and coupling a second connector at the other end of said cable to a corresponding connector in said portable electronic device, said corresponding connector in said portable electronic device providing external access for supplying power to said portable electronic device, wherein said second connector includes electronic circuitry for enumerating said USB, identifying said electronic circuitry as a USB device, and converting the voltage level supplied by said USB to a voltage level usable by said portable electronic device, said electronic circuitry comprising a regulator coupled to a USB function controller, said USB function controller identifying the electronic circuitry as a USB high-power function, said regulator coupled to receive power from said connector on said computer and to output power to said portable electronic device in accordance with the high power function.

11. An electrical cable, comprising:

a first connector for coupling to a corresponding connector on an external surface of a computer, said corresponding connector being coupled to a universal serial bus "USB" in said computer;

a second connector for coupling to a corresponding connector on an external surface of a non-USB enabled portable electronic device;

electrical wires for coupling said first connector to said second connector; and electronic circuitry for enumerating said USB, identifying said electronic circuitry as a USB device, and converting the voltage level supplied by said USB to a voltage level usable by said portable electronic device, said electronic circuitry comprising a regulator coupled to a USB function controller, said USB function controller identifying the electronic circuitry as a USB high-power function, said regulator coupled to receive power from said connector on said computer and to output power to said portable electronic device in accordance with the high power function.

12. An electrical cable, comprising:

a first connector for coupling to a corresponding connector associated with a computer, said corresponding connector being coupled to a universal serial bus "USB" in said computer;

a second connector for coupling to a corresponding connector in a non-USB enabled portable electronic device;

electrical wires for coupling said first connector to said second connector; and electronic circuitry for enumerating said USB, identifying said electronic circuitry as a USB device, and converting the voltage level supplied by said USB to a voltage level usable by said portable electronic device, said electronic circuitry comprising a regulator coupled to a USB function controller, said USB function controller identifying the electronic circuitry as a USB high-power function, said regulator coupled to receive power from said connector on said computer and to output power to said portable electronic device in accordance with the high power function.

13. The electrical cable of claim 12, wherein said electronic circuitry is in said first connector.

14. The electrical cable of claim 12, wherein said electronic circuitry is in said second connector.

15. The electrical cable of claim 12, wherein said electronic circuitry is spaced between said first and second connectors.

16. The system of claim 1, wherein said electronic circuitry draws up to one unit load from the USB prior to said circuitry being identified as a USB high power function.

17. The system of claim 1, wherein said electronic circuitry draws over one but no more than five unit loads from the USB after said circuitry is identified as a USB high power function.

18. The system of claim 2, wherein said circuitry draws up to one unit load from the USB prior to said circuitry being identified as a USB high power function.

19. The system of claim 2, wherein said circuitry draws over one but no more than five unit loads from the USB after said circuitry is identified as a USB high power function.

20. The system of claim 3, wherein said circuitry draws up to one unit load from the USB prior to said circuitry being identified as a USB high power function.

21. The system of claim 3, wherein said circuitry draws over one but no more than five unit loads from the USB after said circuitry is identified as a USB high power function.

22. The method of claim 8, wherein said circuitry draws up to one unit load from the USB prior to said circuitry being identified as a USB high power function.

23. The method of claim 8, wherein said circuitry draws over one but no more than five unit loads from the USB after said circuitry is identified as a USB high power function.

24. The method of claim 9, wherein said circuitry draws up to one unit load from the USB prior to said circuitry being identified as a USB high power function.

25. The method of claim 9, wherein said circuitry draws over one but no more than five unit loads from the USB after said circuitry is identified as a USB high power function.

26. The method of claim 10, wherein said circuitry draws up to one unit load from the USB prior to said circuitry being identified as a USB high power function.

27. The method of claim 10, wherein said circuitry draws over one but no more than five unit loads from the USB after said circuitry is identified as a USB high power function.

28. The system of claim 1, wherein a function is defined as being a high-power function if, when fully powered, it draws over one but no more than five unit loads from the USB.

29. The system of claim 2, wherein a function is defined as being a high-power function if, when fully powered, it draws over one but no more than five unit loads from the USB.

30. The system of claim 3, wherein a function is defined as being a high-power function if, when filly powered, it draws over one but no more than five unit loads from the USB.

31. The method of claim 8, wherein a function is defined as being a high-power function if, when fully powered, it draws over one but no more than five unit loads from the USB.

32. The method of claim 9, wherein a function is defined as being a high-power function if, when fully powered, it draws over one but no more than five unit loads from the USB.

33. The method of claim 10, wherein a function is defined as being a high-power function if, when fully powered, it draws over one but no more than five unit loads from the USB.

34. The electrical cable of claim 11, wherein a function is defined as being a high-power function if, when fully powered, it draws over one but no more than five unit loads from the USB.

35. The electrical cable of claim 12, wherein a function is defined as being a high-power function if, when fully powered, it draws over one but no more than five unit loads from the USB.

* * * * *